United States Patent
Wendel

(10) Patent No.: US 9,645,243 B2
(45) Date of Patent: May 9, 2017

(54) PLATFORM RELATIVE NAVIGATION USING RANGE MEASUREMENTS

(75) Inventor: Jan Wendel, Munich (DE)

(73) Assignee: Astrium GmbH, Taufkirchen (DE)

( * ) Notice: Subject to any disclaimer, the term of this patent is extended or adjusted under 35 U.S.C. 154(b) by 641 days.

(21) Appl. No.: 14/131,444

(22) PCT Filed: Jul. 13, 2012

(86) PCT No.: PCT/EP2012/002953
§ 371 (c)(1),
(2), (4) Date: May 1, 2014

(87) PCT Pub. No.: WO2013/010656
PCT Pub. Date: Jan. 24, 2013

(65) Prior Publication Data
US 2014/0247184 A1   Sep. 4, 2014

(30) Foreign Application Priority Data
Jul. 15, 2011  (EP) .................................... 11005801

(51) Int. Cl.
*G01S 19/11*  (2010.01)
*G01S 5/14*  (2006.01)
(Continued)

(52) U.S. Cl.
CPC ............. *G01S 19/11* (2013.01); *G01S 5/0247* (2013.01); *G01S 5/0284* (2013.01); *G01S 5/14* (2013.01); *G01S 19/15* (2013.01); *G01S 19/53* (2013.01)

(58) Field of Classification Search
CPC .......... G01S 19/11; G01S 19/15; G01S 19/53; G01S 5/14; G01S 5/0247; G01S 5/0284
(Continued)

(56) References Cited

U.S. PATENT DOCUMENTS 3,706,096 A   12/1972  Hammack
5,583,513 A   12/1996  Cohen
(Continued)

FOREIGN PATENT DOCUMENTS

CN         1749773 A    3/2006
CN      101315423 A   12/2008
(Continued)

OTHER PUBLICATIONS

Heinzinger/Hecker,Stand-Alone Ship-Relative Navigation System Based on Pseudolite Technology, Aug. 2009, AIAA, 2009-5867, p. 1, 3-5, Fig. 1.*

(Continued)

*Primary Examiner* — Harry Liu
(74) *Attorney, Agent, or Firm* — Crowell & Moring LLP

(57) ABSTRACT

A method for platform relative navigation using range measurements involves four or more transmitters of positioning signals located on and/or near a platform of a first object and a second object approaching the platform that includes three or more receivers for receiving the positioning signals. For each received positioning signal, a range measurement between the transmitter of the positioning signal and the receiver of the positioning signal is performed. The relative position and relative attitude of a body frame of the second object is estimated with regard to the first object by processing the range measurements with a state space estimation algorithm implementing a model of the system of the first and second object.

12 Claims, 2 Drawing Sheets

(51) Int. Cl.
  *G01S 19/15* (2010.01)
  *G01S 19/53* (2010.01)
  *G01S 5/02* (2010.01)
(58) Field of Classification Search
  USPC .................................................. 342/357.48
  See application file for complete search history.

(56) References Cited

U.S. PATENT DOCUMENTS

| | | | |
|---|---|---|---|
| 8,010,287 B1 * | 8/2011 | Frank .................... | B64D 39/00 |
| | | | 244/135 A |
| 2004/0070498 A1 * | 4/2004 | Michalson ........... | G01C 21/206 |
| | | | 340/539.13 |
| 2005/0040985 A1 * | 2/2005 | Hudson ................ | G01C 21/165 |
| | | | 342/357.31 |
| 2005/0046608 A1 * | 3/2005 | Schantz ............... | H04B 5/0075 |
| | | | 342/127 |
| 2009/0303116 A1 | 12/2009 | Wirola et al. | |
| 2010/0152933 A1 * | 6/2010 | Smoot ................. | G01C 21/165 |
| | | | 701/16 |

FOREIGN PATENT DOCUMENTS

| | | |
|---|---|---|
| CN | 101449178 A | 6/2009 |
| EP | 2 264 478 A2 | 12/2010 |
| FR | 2 836 554 A1 | 8/2003 |
| WO | WO 2005/033733 A1 | 4/2005 |

OTHER PUBLICATIONS

Chinese Office Action dated Feb. 2, 2015, with English translation (forty-four (44) pages).
International Search Report dated Feb. 1, 2013 (three (3) pages).

* cited by examiner

PLATFORM RELATIVE NAVIGATION USING RANGE MEASUREMENTS

TECHNICAL FIELD

Exemplary embodiments of the present invention relate to a method for platform relative navigation using range measurements.

BACKGROUND

For many applications the relative position and attitude between two platforms has to be known. These applications include the automatic landing of an unmanned aerial vehicle (UAV) on a fixed or moving platform like a ship, pilot assistance for landing, ship docking assistance, and many more. Furthermore, it is also desirable for this information to be available in GNSS (Global Navigation Satellite System)-denied environments. For the sake of simplicity, one of the platforms involved is denoted in the following as ship, the other platform as UAV.

A navigation system capable of providing the required relative position and attitude information consists of four or more transponders onboard the ship and three or more antennas onboard the UAV. The antennas transmit interrogation signals, which are replied by the transponders. These replies are then received by the antennas. The time between transmission of an interrogation signal and the reception of a reply is measured, which allows calculation of the range between antenna and replying transponder.

The Doppler shift of the received signal can also be measured, which can be converted to a measurement of the relative velocity between antenna and transponder. Furthermore, instead of using transponders onboard the ship, synchronized pseudolites can also be used. These pseudolites transmit signals similar to GNSS-signals, which are received by the antennas onboard the UAV. In such a scenario, the UAV does not have to transmit signals, but the range measurements are biased by the offset of the receiver clock, and the Doppler measurements are biased by the frequency error of the receiver clock.

A relative navigation system like described above is discussed in the publication "Stand-Alone Ship-Relative Navigation System Based on Pseudolite Technology"; Aulitzky, C.; Heinzinger, O.; Bestmann, U.; Hecker, P.; " AIAA Guidance, Navigation, and Control Conference, 10-13 Aug. 2009, Chicago, Ill., USA. In the method presented in this paper, the relative position of each antenna with regard to the ship body frame is estimated using a non-linear least squares approach, and constraints are applied to consider the relative geometry between these antennas. Then, the relative attitude is calculated from the relative antenna positions. This solution has several drawbacks:

The number of unknowns to be estimated grows with the number of antennas.

Doppler measurements cannot be considered.

The range measurements made from all antennas to all transponders/pseudolites must be valid at the same point in time, otherwise systematic errors are introduced. In other words, it is not possible to sequentially perform measurements, i.e. measuring ranges between the first antenna and the transponders/pseudolites, then measuring ranges with the second antenna, and after that measuring ranges with the third antenna. Such an approach provides range measurements with a different time of validity for each antenna. It is a severe drawback that the method described in the above referenced paper introduces systematic errors in such a scenario, because many off-the-shelf range measurement systems exactly operate that way.

The measurements of additional sensors like an inertial measurement unit (IMU), and a radar or laser altimeter cannot be considered easily, which is also a severe drawback.

SUMMARY OF INVENTION

Exemplary embodiments of the present invention are directed to a method for platform relative navigation using range measurements, which is able to overcome at least a part of the above mentioned drawbacks of the known relative navigation system.

In accordance with the present invention the relative position and attitude of the UAV body frame with regard to the ship is estimated directly instead of estimating the relative antenna positions of a UAV (second object) with regard to a ship (first object), as described in the publication "Stand-Alone Ship-Relative Navigation System Based on Pseudolite Technology"; Aulitzky, C.; Heinzinger, O.; Bestmann, U.; Hecker, P.; "AIAA Guidance, Navigation, and Control Conference, 10-13 Aug. 2009, Chicago, Ill., USA, which is incorporated herein by reference. This can be done with a state space estimation algorithm such as a Kalman filter, a Sigma-Point filter, or other filters, either in a total state space or an error state space formulation. The inventive approach offers the following advantages: the number of unknowns to be estimated does not grow with the number of antennas; Doppler measurements can be considered; the range measurements made from all antennas to all transponders/pseudolites can be valid at any point in time as long as it is known, it is not required that all antennas make synchronized measurements, which facilitates the use of off-the-shelf distance measurement systems; the measurements of additional sensors like IMU, and radar or laser altimeter can be considered easily.

An embodiment of the invention relates to a method for platform relative navigation using range measurements, wherein four or more transmitter of positioning signals are located on and/or near a platform of a first object and a second object approaching the platform comprises three or more receivers for receiving the positioning signals, and wherein the method comprises the acts of performing, for each received positioning signal, a range measurement between the transmitter of the positioning signal and the receiver of the positioning signal, and estimating the relative position and relative attitude of a body frame of the second object with regard to the first object directly by processing the range measurements with a state space estimation algorithm implementing a model of the system of the first and second object.

The estimating of the relative position and relative attitude of a body frame of the second object with regard to the first object may further comprise processing measurements of one or more additional sensors, particularly a radar or laser altimeter.

The state space estimation algorithm can be a Kalman filter, a Sigma-Point filter or another filter allowing to a state space estimation either in a total state space or an error state space formulation.

The state space estimation algorithm may comprise an error state space formulation and perform the following iterative acts of assuming a relative position and relative attitude of the second object from the range measurements, estimating errors in the assumed relative position and relative attitude of the second object, and correcting the assumed relative position and relative attitude of the second object based on the estimated errors.

The state space estimation algorithm can implement using the following system differential equation for estimating errors in the assumed relative position and relative attitude of the second object:

$$\begin{pmatrix} \delta x^S \\ \psi_s^S \end{pmatrix}^\cdot = \begin{pmatrix} 0 & 0 \\ 0 & 0 \end{pmatrix} \begin{pmatrix} \delta x^S \\ \psi_s^S \end{pmatrix} + \begin{pmatrix} I & 0 \\ 0 & I \end{pmatrix} \begin{pmatrix} n_x \\ n_\omega \end{pmatrix},$$

wherein $\delta X^S$ denotes errors in the relative position, $\psi_S^S$ denotes errors in the relative attitude, $n_\omega$ and $n_x$ form a system noise vector.

An assumed relative attitude of the second object may be propagated in a filter prediction step of the state space estimation algorithm using measurements of additional sensors, particularly an inertial measurement unit.

The state space estimation algorithm can model a range measurement $\tilde{\rho}_{ij}$ between j-th transmitter and i-th receiver as follows:

$$\tilde{\rho}_{ij} = \sqrt{(r_{A,i}^S - r_{T,j})^T (r_{A,i}^S - r_{T,j}^S)} + n_{\rho ij}$$

wherein $r_{T,j}^S$ denotes the position of the j-th transmitter, $n_{\rho ij}$ denotes range measurement noise, and wherein the position of the i-th receiver $r_{A,i}^S$ is given by $$r_{A,i}^S = r_{O_b}^S + C_b^S I_i^b,$$

wherein $r_{O_b}^S$ denotes the position of the origin $O_b$ of the body frame of the second object, $I_i^b$ denotes a lever arm from the origin $O_b$ of the body frame of the second object to the i-th receiver, and $C_b^S$ denotes a direction cosine matrix that transforms from the body frame of the second object to the body frame of the first object, wherein this direction cosine matrix is related to an assumed direction cosine matrix via the relative attitude errors.

The system model implemented by the state space estimation algorithm may be augmented with relative velocity error states, and the method may further comprise the acts of performing a Doppler measurement with each received positioning signal, and estimating the relative velocity of the body frame of the second object with regard to the first object by processing the Doppler measurements with the augmented state space estimation algorithm.

A further embodiment of the invention relates to a computer program, which implements a method according to the invention and as described herein and enabling platform relative navigation when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention relates to a computer being configured by a computer program of the invention and as described herein for platform relative navigation. The computer may be for example located on board of a UAV and process positioning signals received via UAV antennas from transmitters located on or near a platform for controlling an automatic and autonomous landing approach procedure of the UAV.

A further embodiment of the invention relates to a device for platform relative navigation comprising a range measurement unit for performing, for a received positioning signal, a range measurement between a transmitter of the positioning signal located on and/or near a platform of a first object and a receiver of a second object approaching the platform, with which the positioning signal is received, and processing means for estimating the relative position and relative attitude of a body frame of the second object with regard to the first object by processing range measurements between transmitter of positioning signals and receiver of the positioning signals with a state space estimation algorithm implementing a model of the system of the first and second object, wherein the processing means are configured to perform a method of the invention and as described herein.

A yet further embodiment of the invention relates to a vehicle, particularly a UAV, comprising three or more receivers for receiving positioning signals emitted by four or more transmitter located on and/or near a platform of another vehicle, and a device of the invention and as described herein.

A yet further embodiment of the invention relates to a system for platform relative navigation using range measurements comprising four or more transmitter of positioning signals, which are located on and/or near a platform of a first object, three or more receivers for receiving the positioning signals, which are located on board of a second object approaching the platform, and a device of the invention and as described herein.

In the system, a transmitter of a positioning signal may be implemented as a transponder being adapted to reply to an interrogation signal transmitted by a receiver with a reply signal, and a receiver may be adapted to receive the reply signal as a positioning signal from the transponder and to measure the time between transmission of the interrogation signal and the reception of the reply signal, wherein the measured time is processed for a range measurement.

Alternatively or additionally, in the system, a transmitter of a positioning signal may be implemented as a pseudolite being adapted to emit a GNSS similar signal as positioning signal, wherein several pseudolites located on and/or near the platform of the first object are synchronized, and a receiver may be adapted to receive a positioning signal from a pseudolite and to measure the transmission time of the positioning signal, wherein the measured transmission time is processed for a range measurement.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
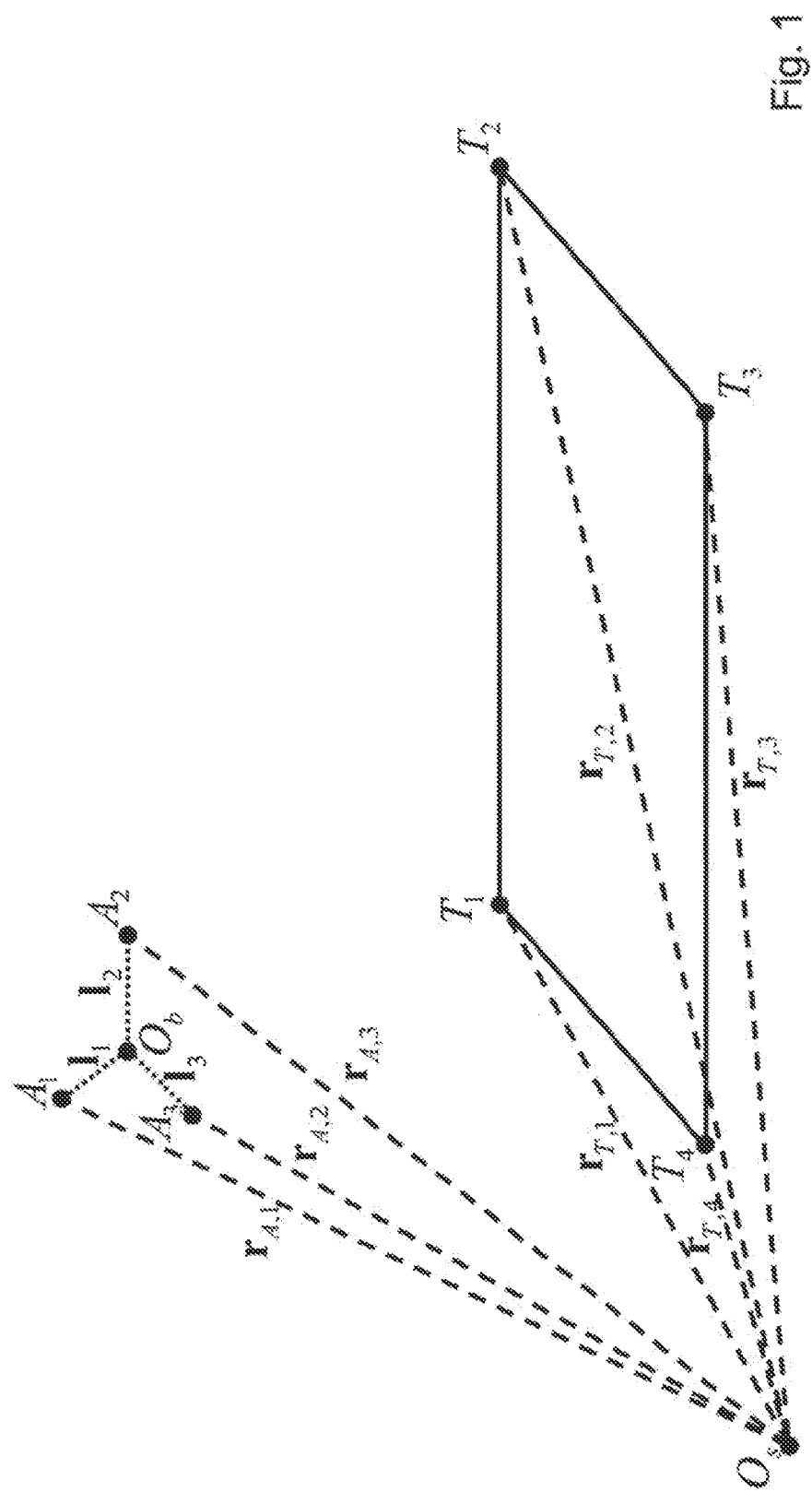
FIG. 1 shows an example of the system geometry of a UAV with 3 antennas approaching a landing platform on a ship, which comprises 4 transponder emitting positioning signals.

In the following, functionally similar or identical elements may have the same reference numerals. Embodiments of the present invention are described with regard to a (landing) platform of a ship (first object) and a UAV (second object) approaching the landing platform. However, the invention is not restricted to this application, but can be applied to any kind of relative navigation of a second object with regard to a first object. Communication between the objects is performed by means of RF (Radio Frequency), even if other communication means are also possible such as optical communication technologies.

FIG. 1 shows a system geometry example, with which the present invention can be used. A UAV is denoted by $O_b$, which is the origin of the UAV's body frame. The UAV further comprises 3 antennas $A_1$-$A_3$ as receivers for positioning signals. The distances between the antennas $A_1$-$A_3$ and the body frame origin $O_b$ are denoted with $l_1$-$l_3$, which are lever arms of the antennas $A_1$-$A_3$ with regards to the origin $O_b$. A landing platform for the UAV on a ship is marked with 4 transmitters $T_1$-$T_4$, which are located at the corners of the platform. The origin of the ship and of a common coordinate system for relative navigation is denoted with $O_s$. The positions of the antennas $A_1$-$A_3$ in the common coordinate system are denoted with the vectors $r_{A,1}$-$r_{A,3}$ and the positions of the transmitters $T_1$-$T_4$ are denoted with the vectors $r_{T,1}$-$r_{T,4}$.

The transmitters $T_1$-$T_4$ can be implemented as transponders, which transmit positioning signals upon receipt of interrogation signals transmitted by the UAV via the antennas $A_1$-$A_3$. The transmitters $T_1$-$T_4$ can also be implemented as pseudolites, which transmit their positioning signals without receiving an interrogation signal.

The positioning signals transmitted by the transmitters $T_1$-$T_4$ can be similar to or even identical with GNSS signals such as positioning signals from the GNSS GPS (Global Positioning System) or the planned European GNSS GALILEO. Particularly, the positioning signals can be code multiplexed signals containing a navigation message with the positions $r_{T,1}$-$r_{T,4}$ of the transmitters $T_1$-$T_4$. Each transmitter may possess its own unique code sequence for coding a transmitted positioning signal so that a receiver of a positioning signal can determine its transmitter.

According to the present invention, the relative position and attitude of the UAV body frame with regard to the ship is estimated directly. This can be done with a Kalman filter, a Sigma-Point filter, or other state space estimation filters (algorithms), either in a total state space or an error state space formulation. The application of a Kalman filter for relative navigation is described in detail in the publication "Stand-Alone Ship-Relative Navigation System Based on Pseudolite Technology"; Aulitzky, C.; Heinzinger, O.; Bestmann, U.; Hecker, P.; " AIAA Guidance, Navigation, and Control Conference, 10-13 Aug. 2009, Chicago, Ill., USA.

The applied filter or state space estimation algorithm can be implemented either at least partly in software, for example in a computer program, which can be executed by a processor, or in hardware, for example in an integrated circuit such as a navigation processor. The implementation of the filter receives as inputs range measurements and outputs relative navigation data, which can for example be processed by an automatic positioning system of the UAV for automatically landing the UAV on the platform of the ship.

In the following, an error state space formulation of an implementation of a state space estimation algorithm (filter) according to the inventive concept shall be considered for illustrating the inventive concept. When one or more range measurements performed as described below are available, the filter estimates the errors in the assumed relative position and attitude of the UAV. These estimated errors are then used to correct the assumed relative position and attitude. A suitable system differential equation implemented by the filter is given by $$\begin{pmatrix} \delta x^s \\ \psi_s^s \end{pmatrix}^{\cdot} = \begin{pmatrix} 0 & 0 \\ 0 & 0 \end{pmatrix}\begin{pmatrix} \delta x^s \\ \psi_s^s \end{pmatrix} + \begin{pmatrix} I & 0 \\ 0 & I \end{pmatrix}\begin{pmatrix} n_x \\ n_\omega \end{pmatrix}, \quad \text{(equation 1)}$$

where $\delta x^s$ denotes the three errors in the relative position, $\psi_s^s$ denotes the three errors in the relative attitude, $n_\omega$ and $n_x$ form the system noise vector. The latter is required to allow for changes in relative position and attitude.

If an IMU is available, the assumed relative attitude can be propagated in the filter prediction step using the IMU measurements, for example gyroscope measurements, which prevents rapid UAV attitude changes from contributing to the relative attitude that has to be tracked by the filter.

For estimating the relative position and attitude of the UAV, range measurements are processed by the filter. A range measurement is performed for each positioning signal received by the UAV from the positioning signal transmitter. A range measurements results in a pseudorange between the transmitter of a received positioning signal and the receiving antenna of the UAV. A range measurement (pseudorange) between transmitter j and receiving antenna i can be modeled as follows (the superscript "s" denotes "ship" as the origin of the common coordinate system which is the ship's origin Os):

$$\tilde{\rho}_{ij} = \sqrt{(r_{A,i}^s - r_{T,j}^s)^T(r_{A,i}^s - r_{T,j}^s)} + n_{\rho ij} \quad \text{(equation 2)}$$

Hereby, the range measurement noise is denoted with $n_{\rho ij}$, and the position of the i-th antenna is given by $$r_{A,i}^s = r_{O_b}^s + C_b^s l_i^b \quad \text{(equation 3)},$$

where $C_b^s$ denotes the direction cosine matrix that transforms from the UAV body frame to the ship body frame. This direction cosine matrix is related to the assumed direction cosine matrix via the relative attitude errors of the UAV.

The above equation allows determining the relative position $r_{Ob}$ of the UAV body frame directly with regard to the ship.

Also, the above described system and measurement models allow developing a suitable filter implementation.

In order to allow for the processing of Doppler measurements, the system model can be augmented with three relative velocity error states leading to a nine-state filter. If range and Doppler measurements are biased by UAV clock and frequency error, the system and measurement models can be augmented accordingly, too. It is understood that if the absolute UAV attitude is known, the relative position and velocity information can be transformed easily to e.g. a local level coordinate system.

Figure 2:
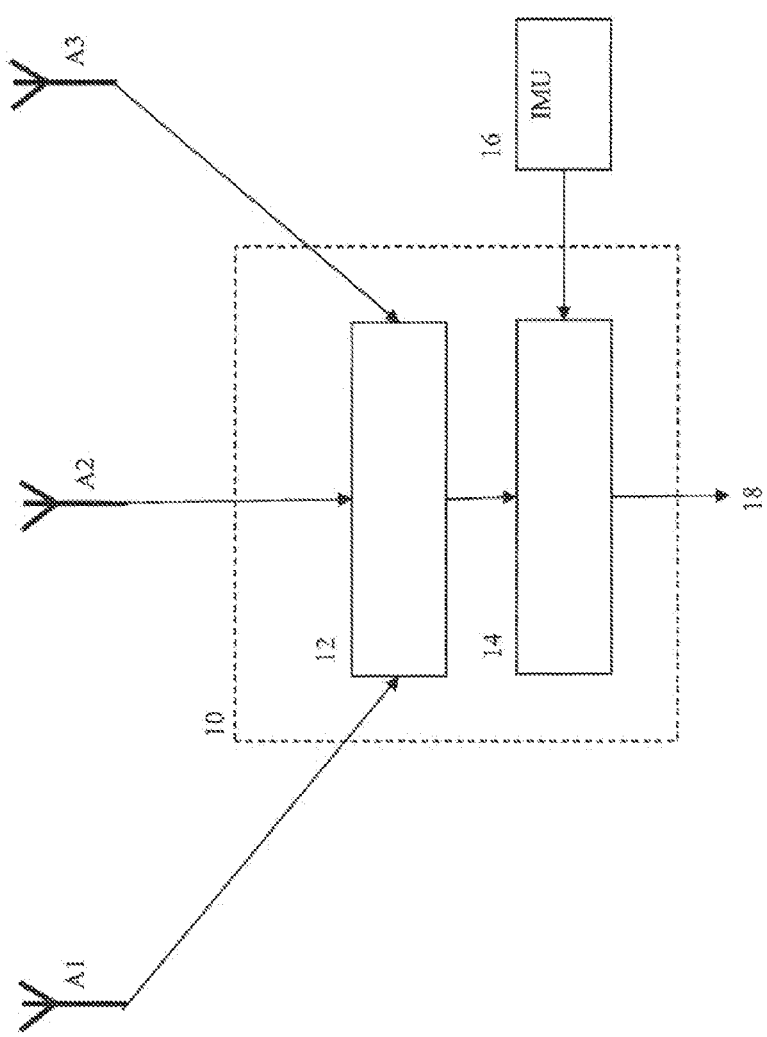
FIG. 2 shows an embodiment of a device for platform relative navigation according to the invention.

FIG. 2 shows a relative navigation device 10, which can, for example, be installed on board of a UAV and used to generate relative navigation data, which can be processed for controlling an automatic landing of the UAV on the landing platform of a ship.

Device 10 comprises a range measurement unit 12 and processing means 14. It receives as inputs positioning signals received via antennas $A_1$-$A_3$ and measurements from an IMU 16. For each received positioning signal the range measurements unit 12 performs a range measurement in order to determine a pseudorange between the transmitter of the positioning signal and the receiving antenna. The performed range measurements are supplied by the range measurement unit to the processing means 14 for generating relative navigation data 18. The processing means 14 comprise a Kalman filter as state space estimation algorithm implementing a model of the system of the ship and the UAV. The Kalman filter implements the above equations 1-3 for processing the range measurements and, furthermore, uses the measurements received from the IMU 16 for assuming a relative attitude of the UAV for propagation in the Kalman filter prediction step. The range measurement unit 12 and/or the processing means 14 can be implemented in soft- or hardware.

The present invention platform enables a relative navigation using range measurements, wherein the number of unknowns to be estimated does not grow with the number of antennas, Doppler measurements can be considered, and the measurements of additional sensors like IMU, and radar or laser altimeter can be considered easily.

REFERENCE NUMERALS AND ACRONYMS

10 platform relative navigation device
12 range measurement unit
14 Kalman filter
16 IMU
18 relative navigation data
$A_1$-$A_3$ antennas
$T_1$-$T_4$ transponder/pseudolites
GNSS Global Navigation Satellite System
GPS Global Positioning System
IMU Inertial Measurement Unit
UAV Unmanned Aerial Vehicle

The invention claimed is:

1. A method for platform relative navigation using range measurements, wherein four or more transmitters of positioning signals are located on or near a platform of a first object and a second object approaching the platform comprises three or more receivers for receiving the positioning signals, wherein the method comprises the acts of:
   performing, for each received positioning signal, a range measurement between one of the transmitters of the positioning signal and one of the receivers of the positioning signal; and
   directly estimating, by a processor, a relative position and relative attitude of a body frame of the second object with regard to the first object by processing the range measurements with a state space estimation algorithm implementing a model of the system of the first and second object,
   wherein the state space estimation algorithm comprises an error state space formulation and performs the following iterative acts of:
      assuming a relative position and relative attitude of the second object from the range measurements,
      estimating errors in the assumed relative position and relative attitude of the second object, and
      correcting the assumed relative position and relative attitude of the second object based on the estimated errors.

2. The method of claim 1, wherein the state space estimation algorithm is a Kalman filter, a Sigma-Point filter or another filter allowing a state space estimation to be performed either in a total state space or an error state space formulation.

3. The method of claim 1, wherein the state space estimation algorithm implements the following system differential equation for estimating errors in the assumed relative position and relative attitude of the second object:

$$\begin{pmatrix} \delta x^s \\ \psi_s^s \end{pmatrix}^{\cdot} = \begin{pmatrix} 0 & 0 \\ 0 & 0 \end{pmatrix} \begin{pmatrix} \delta x^s \\ \psi_s^s \end{pmatrix} + \begin{pmatrix} I & 0 \\ 0 & I \end{pmatrix} \begin{pmatrix} n_x \\ n_\omega \end{pmatrix},$$

wherein $\delta X^s$ denotes errors in the relative position, $\psi_s^s$ denotes errors in the relative attitude, $n_\omega$ and $n_x$ form a system noise vector.

4. The method of claim 1, wherein the system model implemented by the state space estimation algorithm is augmented with relative velocity error states, and the method further comprises the acts of:
   performing a Doppler measurement with each received positioning signal; and
   estimating relative velocity of the body frame of the second object with regard to the first object by processing the Doppler measurements with the augmented state space estimation algorithm.

5. A method for platform relative navigation using range measurements, wherein four or more transmitters of positioning signals are located on or near a platform of a first object and a second object approaching the platform comprises three or more receivers for receiving the positioning signals, wherein the method comprises the acts of:
   performing, for each received positioning signal, a range measurement between one of the transmitters of the positioning signal and one of the receivers of the positioning signal; and
   directly estimating, by a processor, a relative position and relative attitude of a body frame of the second object with regard to the first object by processing the range measurements with a state space estimation algorithm implementing a model of the system of the first and second object,
   wherein the directly estimating of the relative position and relative attitude of a body frame of the second object with regard to the first object further comprises processing measurements of one or more additional sensors, which include a radar or laser altimeter.

6. The method of claim 5, wherein the state space estimation algorithm comprises an error state space formulation and performs the following iterative acts of:
   assuming a relative position and relative attitude of the second object from the range measurements;
   estimating errors in the assumed relative position and relative attitude of the second object, and
   correcting the assumed relative position and relative attitude of the second object based on the estimated errors.

7. The method of claim 5, wherein an assumed relative attitude of the second object is propagated in a filter prediction step of the state space estimation algorithm using measurements of an inertial measurement unit.

8. The method of claim 5, wherein the state space estimation algorithm models a range measurement $\tilde{\rho}_{ij}$, between j-th transmitter and i-th receiver as follows:

$$\tilde{\rho}_{ij} = \sqrt{(r_{A,i}^s - r_{T,j}^s)^T (r_{A,i}^s - r_{T,j}^s)} + n_{\rho ij}$$

wherein $r_{T,j}^s$ denotes the position of the j-th transmitter, $n_{\rho ij}$ denotes range measurement noise, and wherein the position of the i-th receiver $r_{A,i}^s$ is given by $$r_{A,i}^s = r_{O_b}^s + C_b^s I_i^b,$$

wherein $r_{O_b}^s$ denotes the position of the origin $O_b$ of the body frame of the second object, $I_i^b$ denotes a lever arm from the origin $O_b$ of the body frame of the second object to the i-th receiver, and $C_b^s$ denotes a direction cosine matrix that transforms from the body frame of the second object to the body frame of the first object, wherein this direction cosine matrix is related to an assumed direction cosine matrix via the relative attitude errors.

9. A non-transitory record carrier storing a computer program, which, when executed by a processor causes the processor to perform the acts of:
  performing, for each received positioning signal, a range measurement between a transmitter of a positioning signal and a receiver of the positioning signal; and
  directly estimating, by a processor, a relative position and relative attitude of a body frame of a second object with regard to a first object by processing the range measurements with a state space estimation algorithm implementing a model of the system of the first and second object,
  wherein four or more transmitters of positioning signals are located on or near a platform of the first object and the second object approaching the platform comprises three or more receivers for receiving the positioning signals,
  wherein the state space estimation algorithm comprises an error state space formulation and performs the following iterative acts of:
    assuming a relative position and relative attitude of the second object from the range measurements,
    estimating errors in the assumed relative position and relative attitude of the second object, and
    correcting the assumed relative position and relative attitude of the second object based on the estimated errors.

10. A device for platform relative navigation comprising:
  a range measurement unit configured to perform, for a received positioning signal, a range measurement between a transmitter of the positioning signal located on or near a platform of a first object and a receiver of a second object approaching the platform, with which the positioning signal is received; and
  a processor configured to estimate a relative position and relative attitude of a body frame of the second object with regard to the first object by processing range measurements between transmitter of positioning signals and receiver of the positioning signals with a state space estimation algorithm implementing a model of the system of the first and second object,
  wherein the state space estimation algorithm comprises an error state space formulation and performs the following iterative acts of:
    assuming a relative position and relative attitude of the second object from the range measurements,
    estimating errors in the assumed relative position and relative attitude of the second object, and
    correcting the assumed relative position and relative attitude of the second object based on the estimated errors.

11. The device of claim 10, wherein the device is an unmanned aerial vehicle, which further comprises:
  three or more receivers configured to receive positioning signals emitted by four or more transmitters located on or near a platform of another vehicle.

12. A system for platform relative navigation using range measurements comprising:
  four or more transmitters of positioning signals, which are located on or near a platform of a first object;
  three or more receivers configured to receive the positioning signals, which are located on board of a second object approaching the platform, and
  a device comprising
    a range measurement unit configured to perform, for a received positioning signal, a range measurement between one of the transmitters of the positioning signal located on or near a platform of the first object and one of the receivers of the second object approaching the platform, with which the positioning signal is received; and
    a processor configured to estimate a relative position and relative attitude of a body frame of the second object with regard to the first object by processing range measurements between transmitter of positioning signals and receiver of the positioning signals with a state space estimation algorithm implementing a model of the system of the first and second object,
  wherein the transmitters of the positioning signals are transponder configured to reply to an interrogation signal transmitted by one of the receivers with a reply signal, and
  wherein the receivers are configured to receive, as the positioning signal, the reply signal from the transponder and to measure a time between transmission of the interrogation signal and the reception of the reply signal, wherein the measured time is processed for a range measurement.

* * * * *